US012132818B2

United States Patent
Emmadi et al.

(10) Patent No.: US 12,132,818 B2
(45) Date of Patent: Oct. 29, 2024

(54) METHOD AND SYSTEM FOR PRIVACY PRESERVING CLASSIFICATION OF WEBSITES URL

(71) Applicant: Tata Consultancy Services Limited, Mumbai (IN)

(72) Inventors: Nitesh Emmadi, Hyderabad (IN); Harika Narumanchi, Chennai (IN); Imtiyazuddin Shaik, Hyderabad (IN); Rajan Mindigal Alasingara Bhattachar, Bangalore (IN); Harshal Tupsamudre, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 431 days.

(21) Appl. No.: 17/179,244

(22) Filed: Feb. 18, 2021

(65) Prior Publication Data

US 2021/0367758 A1    Nov. 25, 2021

(30) Foreign Application Priority Data

May 21, 2020   (IN) .............................. 202021021474

(51) Int. Cl.
*H04L 9/00* (2022.01)
*G06N 3/08* (2023.01)

(52) U.S. Cl.
CPC ............... *H04L 9/008* (2013.01); *G06N 3/08* (2013.01)

(58) Field of Classification Search
CPC .................................. H04L 9/008; G06N 3/08
See application file for complete search history.

(56) References Cited

U.S. PATENT DOCUMENTS 10,104,113 B1 * 10/2018 Stein .................... H04L 63/1425
10,834,128 B1 * 11/2020 Rajagopalan ......... H04L 51/212
(Continued)

OTHER PUBLICATIONS

Aldwairi, Monther, and Rami Alsalman. "Malurls: A lightweight malicious website classification based on url features." Journal of Emerging Technologies in Web Intelligence 4.2 (2012): 128-133. (http://www.jetwi.us/uploadfile/2014/1222/20141222022522900. pdf) (Year: 2012).*

(Continued)

*Primary Examiner* — Alexander Lagor
*Assistant Examiner* — Joshua N Gonzales
(74) *Attorney, Agent, or Firm* — Finnegan, Henderson, Farabow, Garrett & Dunner, LLP (57) ABSTRACT

Malicious website detection has been very crucial in timely manner to avoid phishing. User privacy also needs to be maintained at the same time. A system and method for classifying a website URL have been provided. The system is configured to achieve end-to-end privacy for machine learning based malicious URL detection. The system provides privacy preserving malicious URL detection models based on Fully Homomorphic Encryption (FHE) approach either using deep neural network (DNN), using logistic regression or using a hybrid approach of both. The system is utilizing a split architecture (client-server) where-in feature extraction is done by a client machine and classification is done by a server. The client machine encrypts the query using FHE and sends it to the server which hosts machine learning model. During this process, the server doesn't learn any information about the query.

7 Claims, 10 Drawing Sheets

(56) References Cited

U.S. PATENT DOCUMENTS

| | | | | |
|---|---|---|---|---|
| 11,196,541 | B2* | 12/2021 | Williams | G06N 3/08 |
| 11,556,644 | B1* | 1/2023 | Zeppenfeld | G06N 20/00 |
| 11,575,500 | B2* | 2/2023 | Gomez | H04L 9/0825 |
| 11,609,989 | B2* | 3/2023 | Jones | G06F 21/56 |
| 2019/0173897 | A1* | 6/2019 | Okano | G06F 21/552 |
| 2020/0059451 | A1* | 2/2020 | Huang | G06N 3/044 |

OTHER PUBLICATIONS

Rajalakshmi, R., and Chandrabose Aravindan. "Web page classification using n-gram based URL features." 2013 fifth international conference on advanced computing (ICoAC). IEEE, 2013. (https://ieeexplore.ieee.org/iel7/6915272/6921901/06921920.pdf) (Year: 2013).*

Shortell, Thomas et al., "Secure Convolutional Neural Networks using FHE", Cryptography and Security, Aug. 2018, Arxiv, https://arxiv.org/pdf/1808.03819.pdf.

Mishra, Pratyush et al., "Delphi: A Cryptographic Inference Service for Neural Networks", UC Berkeley, Usenix Security Symposium, 2020, Usenix Security, https://eprint.iacr.org/2020/050.pdf.

Zhang, Qiao et al., "GELU-Net: A Globally Encrypted, Locally Unencrypted Deep Neural Network for Privacy-Preserved Learning", Computer Science, 2018, IJCAI, https://www.ijcai.org/Proceedings/2018/0547.pdf.

Le, Hung et al., "URLNet: Learning a URL Representation with Deep Learning for Malicious URL Detection", Cryptography and Security—Machine Learning, Mar. 2018, Arxiv, https://arxiv.org/pdf/1802.03162.pdf.

Tupsamudre, Harshal et al., "Everything Is in the Name—A URL Based Approach for Phishing Detection", Cyber Security Cryptography and Machine Learning, May 2019, Research Gate, https://www.researchgate.net/publication/333812784_Everything_Is_in_the_Name_-_A_URL_Based_Approach_for_Phishing_Detection/link/5d5e911e92851c376371bd26/download.

* cited by examiner

METHOD AND SYSTEM FOR PRIVACY PRESERVING CLASSIFICATION OF WEBSITES URL

PRIORITY CLAIM

This U.S. patent application claims priority under 35 U.S.C. § 119 to: India Application No. 202021021474, filed on 21 May 2020. The entire contents of the aforementioned application are incorporated herein by reference.

TECHNICAL FIELD

The embodiments herein generally relate to the field of malicious Uniform Resource Locator (URL) detection. More particularly, but not specifically, the present disclosure provides a method and system for privacy preserving classification of websites URL using deep neural network or logical regression or hybrid of both based on fully homomorphic encryption.

BACKGROUND

Now a days, browsing malicious websites or phishing are one of the prominent attacks causing loss of billions of dollars every year. Malicious URLs can be sent to users via e-mails, text or pop up messages and they can host malicious content in the form of viruses, Trojans and attack scripts. Attackers use this to obtain sensitive information from users, install malware and obtain control over their systems. Therefore, it is crucial to detect them in a timely manner.

Having seen the devastating effects of malicious websites, there are tools for their detection such as safe browsing. Safe browsing is a mechanism used by web browsers to alert general users who are engaged in browsing activity on malicious websites. Prominent web browsers provide safe browsing capability to the end-users. Safe browsing classifies malicious websites into two categories namely phishing and malicious. However, these tools are being misused by tracking the users browsing data making it a serious privacy concern for the users. Although safe browsing attempts to protect the user privacy to some extent using k-anonymity and differential privacy, there are results that show that there are issues with these safe browsing methods in terms of privacy. Further, in few cases web browsers counter phishing attack by using blacklisting method. Blacklisting is one of the most effective methods to classify URLs, however it fails to detect newly generated malicious websites.

In recent times, machine learning has also been explored. Machine learning is a promising field often being used in wide range of applications that we come across in daily life such as virtual assistants, product recommendations in online marketing websites and also in all industry verticals such as aviation, healthcare, retail and telecom, banking and financial services. Machine learning based URL classification techniques with trained models on server side have emerged as one of the solution to detect new malicious URLs. While malicious URL detection continues to be a problem, another potential concern is the user privacy.

SUMMARY

Embodiments of the present disclosure present technological improvements as solutions to one or more of the above-mentioned technical problems recognized by the inventors in conventional systems. For example, in one embodiment, a system for classifying a website URL is provided. The system comprises a server and a client machine in communication with each other. The server and the client machine further comprises an input module, one or more hardware processors and a memory. The input module provides the website URL as an input URL to the client machine, wherein the input URL is kept at a predefined character length. The memory configured to perform the steps of: extracting a feature vector out of the input URL using one of a: a deep neural network (DNN) based technique, or an n-gram based feature extraction method; encrypting the feature vector using a fully homomorphic encryption (FHE) method, wherein encryption results in generation of a representative encrypted feature vector of the input URL; sending the representative encrypted feature vector of the input URL to a server; computing encrypted intermediate computation results by applying at least one of a deep neural network (DNN) based technique, a logistic regression (LR) based technique, or a hybrid of the DNN based technique and the LR based technique on the representative encrypted feature vector; sending the encrypted intermediate computation results to the client machine; decrypting the encrypted intermediate computation results using the fully homomorphic encryption (FHE) method; and classifying the input URL as one of malicious or benign based on the decrypted intermediate computation results.

In another aspect, the embodiment here provides a method for classifying a website URL. Initially, the website URL is provided as an input URL to a client machine, wherein the input URL is kept at a predefined character length. At next step, a feature vector is extracted out of the input URL using one of a: a deep neural network (DNN) based technique, or an n-gram based feature extraction method. Further, the feature vector is encrypted using a fully homomorphic encryption (FHE) method, wherein encryption results in generation of a representative encrypted feature vector of the input URL. At next step, the representative encrypted feature vector of the input URL is sent to a server. The encrypted intermediate computation results is then computed by applying at least one of a deep neural network (DNN) based technique, a logistic regression (LR) based technique, or a hybrid of the DNN based technique and the LR based technique on the representative encrypted feature vector. At next step, the encrypted intermediate computation results is sent to the client machine. Further, the encrypted intermediate computation result is decrypted using the fully homomorphic encryption (FHE) method. And finally, the input URL is classified as one of malicious or benign based on the decrypted intermediate computation results.

In another aspect the embodiment here provides one or more non-transitory machine readable information storage mediums comprising one or more instructions which when executed by one or more hardware processors cause classifying a website URL. Initially, the website URL is provided as an input URL to a client machine, wherein the input URL is kept at a predefined character length. At next step, a feature vector is extracted out of the input URL using one of a: a deep neural network (DNN) based technique, or an n-gram based feature extraction method. Further, the feature vector is encrypted using a fully homomorphic encryption (FHE) method, wherein encryption results in generation of a representative encrypted feature vector of the input URL. At next step, the representative encrypted feature vector of the input URL is sent to a server. The encrypted intermediate computation results is then computed by applying at least one of a deep neural network (DNN) based technique, a logistic regression (LR) based technique, or a hybrid of the DNN based technique and the LR based technique on the representative encrypted feature vector. At next step, the encrypted intermediate computation results is sent to the client machine. Further, the encrypted intermediate computation result is decrypted using the fully homomorphic encryption (FHE) method. And finally, the input URL is classified as one of malicious or benign based on the decrypted intermediate computation results.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 9, where similar reference characters denote corresponding features consistently throughout the figures, there are shown preferred embodiments and these embodiments are described in the context of the following exemplary system and/or method.

Figure 1:
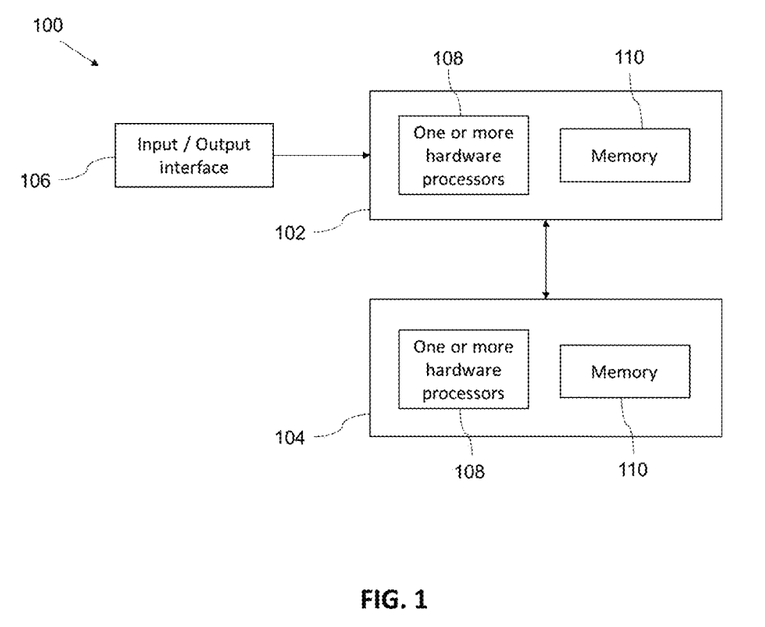
FIG. 1 shows a block diagram of a system for classifying a website URL according to an embodiment of the present disclosure.

According to an embodiment of the disclosure, a system 100 for classifying a website URL is shown in the block diagram of FIG. 1. The system 100 is configured to achieve end-to-end privacy for machine learning based malicious URL detection. The system 100 provides privacy preserving malicious URL detection models based on Fully Homomorphic Encryption (FHE) approach using at least one of a deep neural network (DNN) based technique as shown in schematic of FIG. 2, logistic regression based technique as shown in schematic of FIG. 3 or a hybrid of the DNN based technique and the LR based technique. The system 100 is utilizing a split architecture (client-server) where-in feature extraction is done by a client machine 102 and classification is done by a server 104. The client machine 102 encrypts the query using FHE and sends it to the server 104 which hosts machine learning model. During this process, the server 104 doesn't learn any information about the query. Considering the performance limitations of FHE method, the system 100 is configured to provide solution wherein only the model-dependent part of the query processing is performed on the server 104 in encrypted domain. This architecture mitigates privacy challenges in safe browsing approach. The client machine 102 generates public and private key pairs. The client machine 102 shares public key to the server 104 and keeps the private key secret. All encryptions are performed using client's public key and decryptions are performed at client side using its private key.

According to an embodiment of the disclosure, the system 100 is implemented on the client machine 102 and the server 104. The client machine 102 and the server 104 are in communication with each other. The system 100 further comprises an input module 106, one or more hardware processors 108 and a memory 110 in communication with the one or more hardware processors 108 as shown in the block diagram of FIG. 1. The one or more hardware processors 108 work in communication with the memory 110. The one or more hardware processors 108 are configured to execute a plurality of algorithms stored in the memory 110. The memory 110 further includes a plurality of modules for performing various functions.

According to an embodiment of the disclosure, the input module 106 (Input/Output interface) is configured to providing the website URL as an input URL to the client machine 102. The input URL is kept at a predefined character length. The input module 106 is accessible to the user via smartphones, laptop or desktop configuration thus giving the user the freedom to interact with the system 100 from anywhere anytime. The input module 106 may include a variety of software and hardware interfaces, for example, interfaces for peripheral device(s), such as a keyboard, a mouse, an external memory, a camera device, and a printer. The input module 106 can facilitate multiple communications within a wide variety of networks and protocol types, including wired networks, for example, local area network (LAN), cable, etc., and wireless networks, such as Wireless LAN (WLAN), cellular, or satellite.

Figure 5A:
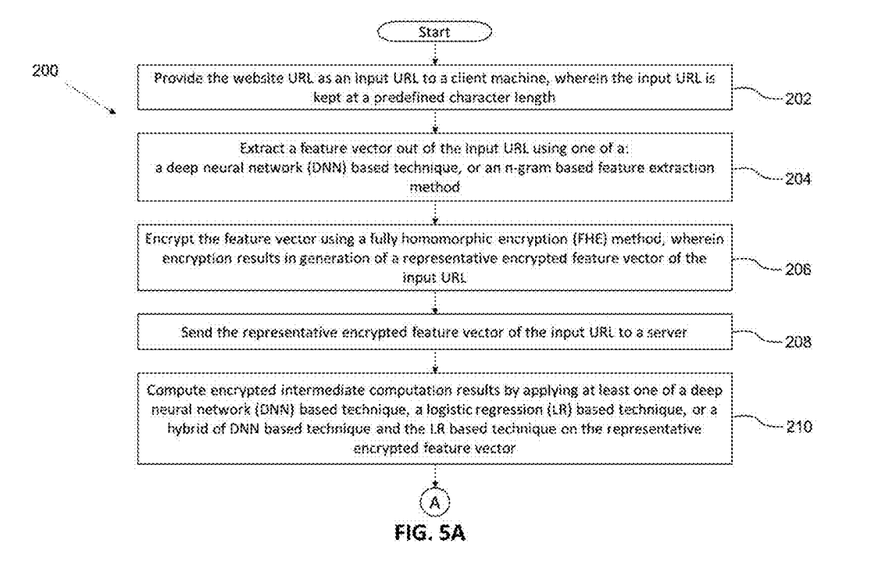
FIGS. 5A-5B show a flowchart illustrating the steps involved in classifying a website URL according to an embodiment of the present disclosure.
Figure 5B:
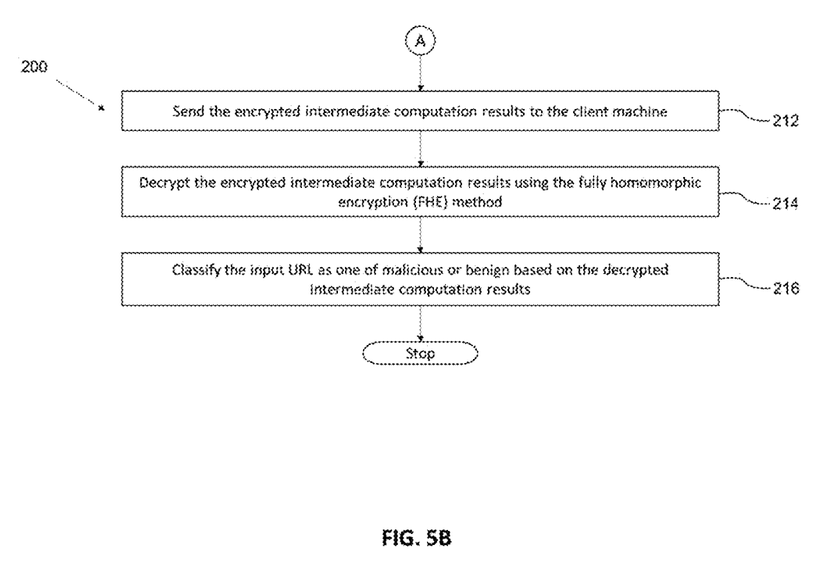

According to an embodiment of the disclosure, the memory 110 configured to perform various steps as shown in the flowchart 200 of FIG. 5A-5B. Initially at step 202, the website URL is provided as an input URL to the client machine 102, wherein the input URL is kept at a predefined character length. At step 204, a feature vector is extracted out of the input URL using one of a deep neural network (DNN) based technique, or an n-gram based feature extraction method.

At step 206, the feature vector is encrypted using a fully homomorphic encryption (FHE) method, wherein encryption results in generation of a representative encrypted feature vector of the input URL. Further at step 208, the representative encrypted feature vector of the input URL is sent to the server 104. At step 210, the encrypted intermediate computation results are computed by applying at least one of a deep neural network (DNN) based technique, a logistic regression (LR) based technique, or a hybrid of the DNN based technique and the LR based technique on the representative encrypted feature vector.

At step 212, the encrypted intermediate computation results are sent to the client machine 102. At step 214, the encrypted intermediate computation results are decrypted using the fully homomorphic encryption (FHE) method. And finally at step 224, the input URL is classified as one of malicious or benign based on the decrypted intermediate computation results.

Figure 6:
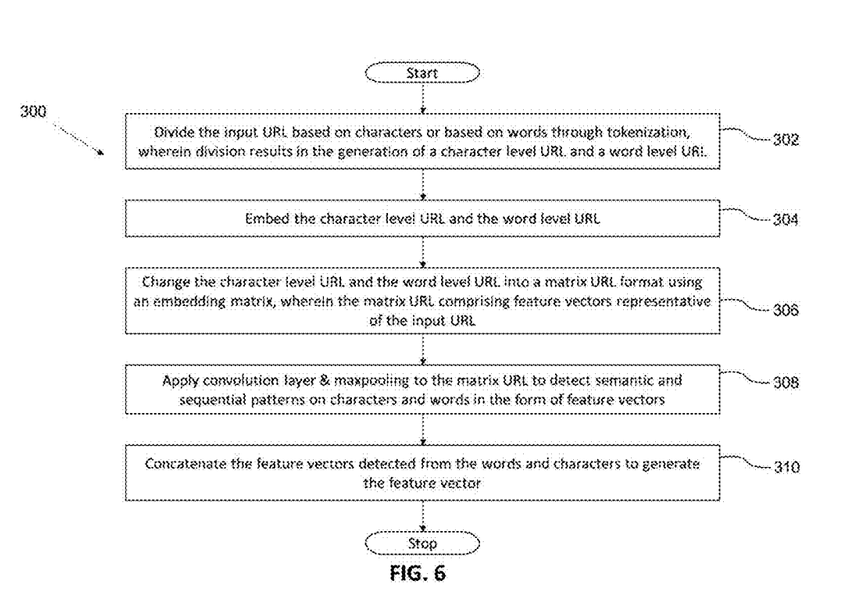
FIG. 6 shows a flowchart illustrating steps involved in DNN based client machine—server architecture for privacy preserving malicious URL detection according to an embodiment of the present disclosure.

According to an embodiment of the disclosure, a flowchart 300 shows steps involved in DNN based client machine—server architecture for privacy preserving malicious URL detection as shown in FIG. 6. At next step 302, the input URL is divided based on characters or based on words through tokenization, wherein the division results in the generation of a character level URL and a word level URL. At step 304, the character level URL and the word level URL are embedded. Further at step 306, the character level URL and the word level URL are changed into a matrix URL format using an embedding matrix. The matrix URL comprising feature vectors representative of the input URL. The client machine 102 generates a public and private key pairs. The private key is kept secret by the client machine 102 and the public key is shared publicly. The server 104 can have weights encrypted or unencrypted. The client machine 102 generates public and private key pairs. The client machine 102 shares public key to the server 104 and keeps the private key secret. All encryptions are performed using client's public key and decryptions are performed at client side using its private key.

At next step 308, the convolution layer & maxpooling is applied to the matrix URL to detect semantic and sequential patterns on characters and words in the form of feature vectors, wherein max pooling is s a sample-based discretization process. And finally at step 310, the feature vectors detected from the words and characters are concatenated to generate a resultant feature vector. This resultant vector can further be used for the classification of the website URL as explained in the earlier part of the disclosure.

Figure 7:
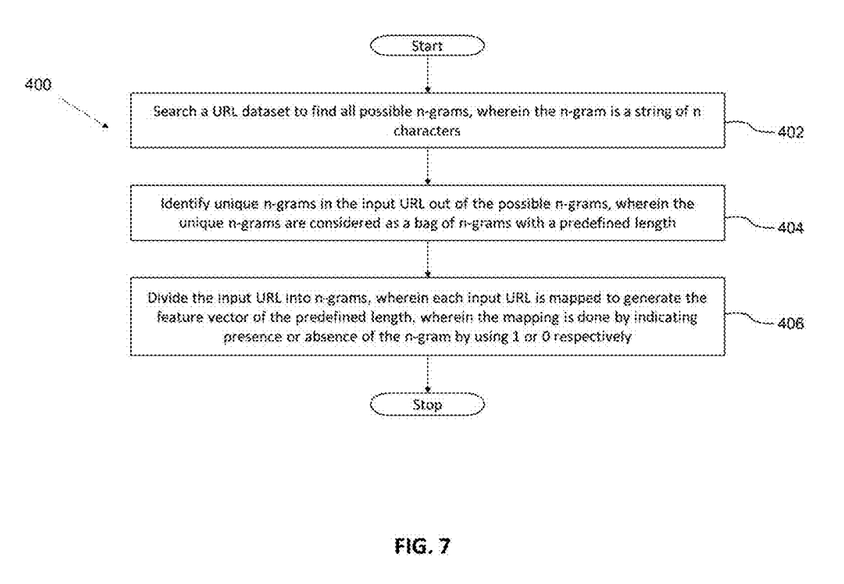
FIG. 7 shows a flowchart illustrating steps involved in logistic regression based client machine—server architecture for privacy preserving malicious URL detection according to an embodiment of the disclosure.

According to an embodiment of the disclosure, a flowchart 400 shows steps involved in logistic regression based client machine—server architecture for privacy preserving malicious URL detection as shown in FIG. 7. Initially at step 402, a URL dataset is searched to find all possible n-grams, wherein the n-gram is a string of n characters. At step 404, the unique n-grams are identified in the input URL out of the possible n-grams. The unique n-grams are considered as a bag of n-grams with a predefined length. And finally at step 406, the input URL is divided into n-grams, wherein each input URL is mapped to generate the feature vector of the predefined length, wherein the mapping is done by indicating presence or absence of the n-gram by using 1 or 0 respectively. Further, the generated feature vector is used to classify the website URL.

According to an embodiment of the disclosure, the FHE method, DNN based technique and the logical reasoning based technique have been described in detail as follows.

The FHE method enables computations on encrypted data without the need for decryption. Given a set of ciphertexts $C_1, \ldots C_n$ for plaintext messages $m_1 \ldots m_n$ respectively encrypted with a key, one can evaluate an arbitrary function say $f(m_1 \ldots m_n)$ without compromising privacy of plaintext messages. A public key FHE method $\xi$ can be described as follows in equation (1)

$$\xi:(Keygen_\xi, Enc_\xi, Dec_\xi, Eval_\xi) \tag{1}$$

where $Keygen_\xi, Enc_\xi, Dec_\xi$ denote the key generation, encryption and decryption functions of $\xi$ respectively and are identical to that of the usual public key encryption schemes.

$Eval_\xi$ is the evaluation algorithm used for computations on encrypted data. This algorithm takes as input a polynomial expression P and a set of ciphertexts $c=\{C_0, C_1, \ldots C_n\}$ which are needed to compute P.

The input output of Eval satisfies following equation (2):

$$Dec_\xi(Eval_\xi(P,c,pk),sk) = P(Dec_\xi(c,sk)) \tag{2}$$

In the above expression pk denotes public key and sk denotes private key.

The FHE method in general supports two primitive operations, addition and multiplication. For addition, the polynomial expression, $P(X, Y)=X+Y$ adds two ciphertexts $C_1$ and $C_2$ that results in addition of corresponding plaintexts as shown in equation (3).

$$Dec_\xi(Eval_\xi(P, C_1, C_2)) = Dec_\xi(P(C_1, C_2)) \tag{3}$$
$$= Dec_\xi(C_1) * Dec_\xi(C_2)$$

Similarly, for multiplication, the polynomial expression, $P(X; Y)=X*Y$ multiplies two ciphertexts $C_1$ and $C_2$ that results in product of corresponding plaintexts as shown in equation (4).

$$Dec_\xi(Eval_\xi(P, C_1, C_2)) = Dec_\xi(P(C_1, C_2)) \tag{4}$$
$$= Dec_\xi(C_1) * Dec_\xi(C_2)$$

The two primitive operations, addition and multiplication, can be used to realize any arbitrary computation on ciphertexts.

According to an embodiment of the disclosure, the system 100 is utilizing deep neural network based on FHE for preserving privacy. Machine learning provides the ability for a computer to learn a task without explicit programming. Deep neural networks are a set of algorithms that can be used to achieve this task.

FHE based DNN is used to provide end to end privacy to the users. Unlike DNN in plaintext, here only training is performed in plaintext whereas prediction is performed on FHE data. This network is made up of several layers with each layer consisting number of neurons, neuron being the building block. A neuron in this setup takes all the inputs such as feature vector $E(x_i)$, encrypted using FHE, weights $w_i$ and bias vector b which server learned during training phase, and gives the output by applying the transfer function that returns an encrypted output as given in equation (5):

$$\Sigma_{i=1}^{n} \omega_i * E(x_i) + b \tag{5}$$

Figure 2:
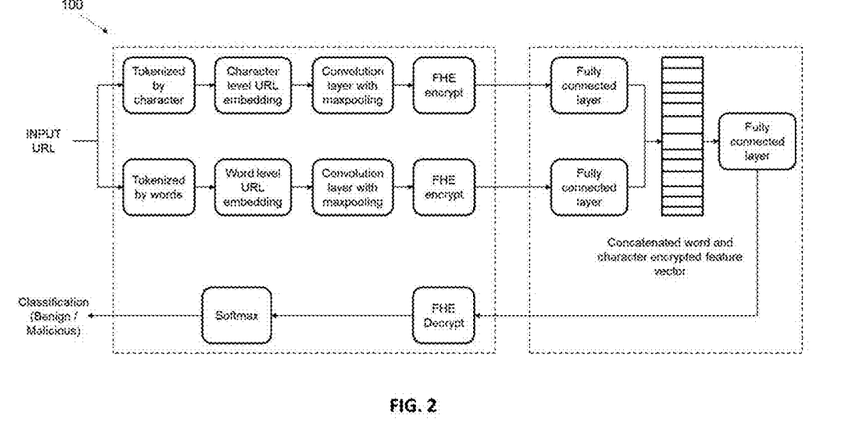
FIG. 2 shows a schematic of deep neural network (DNN) based client machine—server architecture for privacy preserving malicious URL detection according to an embodiment of the disclosure.
Figure 4:
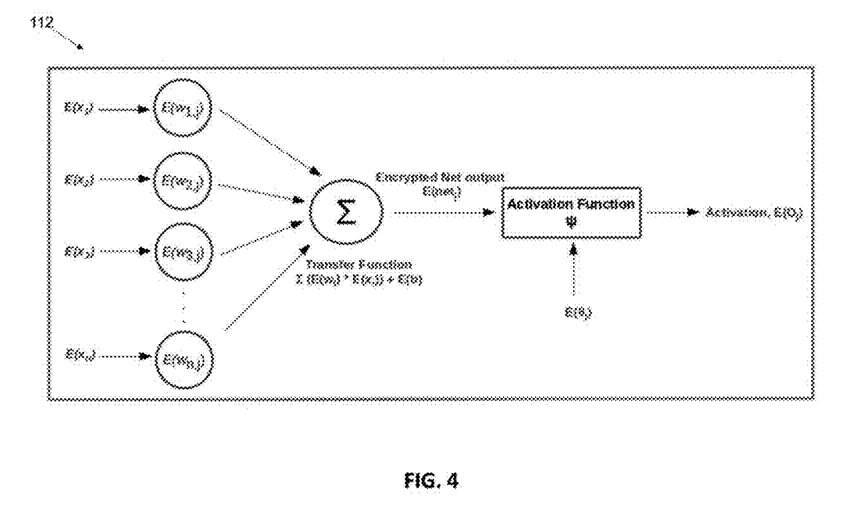
FIG. 4 illustrates neuron computation in fully homomorphic encryption (FHE) setting according to an embodiment of the present disclosure.

This encrypted output is sent to an activation function to get an activation output. The activation function brings non-linearity in the output of a neuron by deciding whether to fire a neuron or not based on the weighted sum and added bias term. Non-linearity makes the neural network capable of learning and perform complex operations. Prominent examples of activation functions include Sigmoid, Tan h, ReLU, leaky ReLU and Softmax. FIG. 4 illustrates neuron computation in FHE setting. FIG. 2 describes DNN based classification using FHE.

The encrypted activation output is the output of the neuron. These neurons are arranged in layers which are collection of neurons operating together to perform a prediction or classification task. The neurons can be arranged in different ways which form different types of neural networks such as feed forward network, fully connected neural network, convolution network, Radial bias function neural network and so on. In a fully connected layer, every neuron is connected to every other neuron of the next layer which are used to learn the categorization. The convolution layer was used to learn features from data. This layer has a set of filters which are of dimension n*n applied on an input matrix to get a convolved output. For example, convolution filters applied on the input URL can detect semantic and sequential patterns on characters and words in URL. In an embodiment of the present disclosure, a fully connected neural network is used for classification of an encrypted input URL as malicious or not.

According to an embodiment of the present disclosure, malicious URL can be detected using DNN based on FHE as shown in schematic of FIG. 2. In an example of the disclosure, CNN based model URLnet has been used due to its advanced detection capabilities and efficiency. The privacy preserving machine learning model for malicious URL detection based on FHE is broadly classified into encoding component that changes the input URL u into a matrix format and inference component deals with the classification of URL as malicious or benign. FIG. 2 depicts client machine—server architecture for privacy preserving malicious URL detection. To get optimal performance using FHE the encoding part is done on client side (as this is model independent) and inference part is performed on server side (as this is model dependent). Encoding can be performed using at least one of the following only character-based CNN
only word-based CNN
character and word CNN
character level word CNN
character and character level word CNN Out of these character and character level word CNN gives optimal performance.

According to an embodiment of the disclosure, the encoding component can be explained as follows. Initially, URL sequence length is taken at a predefined character length. In an example, the predefined character length is decided as 200 characters. So the characters above the predefined character length are truncated. In case of lesser length, characters are padded with <PAD> to make it to the predefined character length.

In character level CNN, the URL is tokenized into characters $\{u_1 \ldots u_n\}$ and each character is assigned a character ID $\{cid_n, cid_n\}$. A character level embedding matrix cematrix is represented as a sequence of 32 dimension vectors randomly initialized for all characters for each unique character in the URL. Embedding matrix is updated based on each training phase. Based on the updated character embedding matrix, this URL is represented as a character level URL matrix cmatrix.

In word level CNN, the URL is also passed to word level CNN and tokenized into words $\{w_1 \ldots w_n\}$. Each occurrence of unique words in the training is represented as a 32 dimension vector. These words are represented as word level URL representation.

In character level word CNN, the representation is obtained by element wise addition of word level representation obtained using word embedding matrix and word IDs and wcmatrix. To obtain wcmatrix, each word out of L unique words in the URL is represented as a sequence of character IDs to get a matrix with a sequence of words in character ID format. Each row in this matrix is replaced by an entry in character embedding matrix to get L matrices of dimension URL size 32. By sum pooling these matrices over L a word level representation of URL is obtained.

The outputs of embedding layers are 1024 dimension feature vector. These are encrypted by the client machine 102 to get $\{E(cw_1) \ldots E(cw_n)\}$ which are given as input to the server 104. These encrypted vectors are homo-morphically batched to improve the performance of the network.

According to an embodiment of the disclosure, the inference component is described as follows: On receiving encrypted feature vector from the client machine, the server 104 passes these encrypted input through a fully connected network to give two 512 dimension feature vectors. These feature vectors are concatenated to form 1024 dimension feature vector. The server 104 then passes this through a fully connected network. Fully connected layer consists of four layers which convert input of 1024 feature vector, into 512, 256, 128 and 2 respectively. The first three layers use ReLU activation function and the output is sent to the client machine 102 which then decrypts and uses Softmax to get the classification results.

According to an embodiment of the disclosure, URLnet uses ReLU in the fully connected layers and Softmax in the final output layer. ReLU is chosen to add non linearity in the network to perform robust prediction. ReLU function is as follows in equation (6):

$$ReLU(x) = \max(0, x) \tag{6}$$

Let $y_1 \ldots y_n$ be the n real numbers the Softmax function normalizes these into a probability distribution having n probabilities as follows in equation (7):

$$\frac{e^{y_i}}{\sum_{i=1}^{n} e^{y_i}} \tag{7}$$

These activation functions are computed on encrypted data and usually have more multiplicative depth. Therefore, approximation version of activation function ReLU was used to get optimal performance. ReLU approximation polynomial is computed using the points $X_i$, $ReLU(X_i)$ where $X_i$ are randomly picked from a standard normal distribution. The ReLU approximation polynomial of degree 5 is as follows:

$$0.1488 + 0.4993X + 0.3007X^2 - 0.0003X^3 - 0.0168X^4$$

The ReLU approximation polynomial of degree 4 is as follows:

$$1.1500 + 0.5012X + 0.2981X^2 - 0.0004X^3 - 0.0388X^4$$

The approximation ReLU 2 is comparatively inexpensive than approximation ReLU 1 but has significantly low accuracy (52.87%) than approximation ReLU 1 (93.49%). Hence, approximate ReLU 1 was considered for better accuracy.

Figure 3:
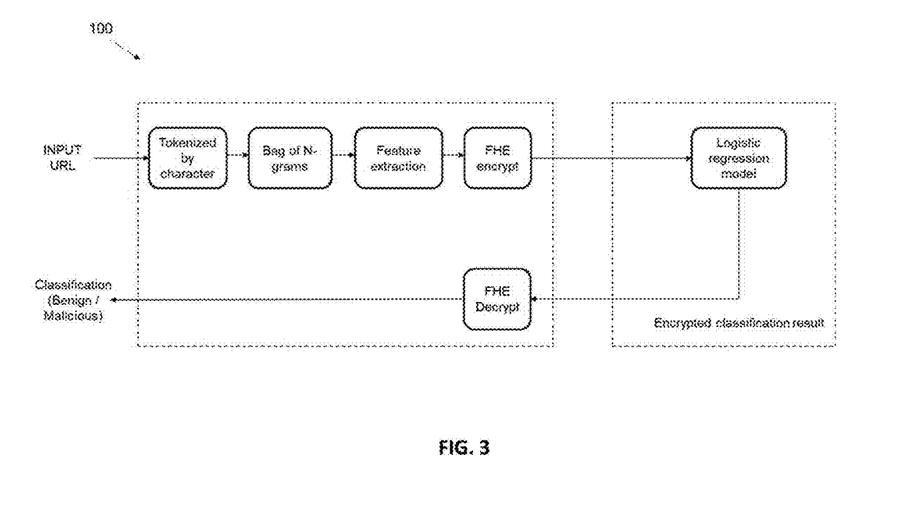
FIG. 3 shows a schematic of logistic regression based client machine—server architecture for privacy preserving malicious URL detection according to an embodiment of the disclosure.

According to another embodiment of the disclosure, for privacy enabled malicious URL detection can also be done using logistic regression based on FHE techniques as shown in schematic of FIG. 3. Logistic regression is widely used machine learning algorithm for classification. In this model, feature extraction technique is based on n-grams. In n-grams based feature extraction, URL is split into tokens based on special characters and converted into bag of n-grams.

FIG. 3 shows the architecture for logistic regression based URL classifier using FHE. Here the feature extraction using bag of n-grams is done by the client machine 102 and the encrypted feature vector is sent to the server 104, which preserves privacy of user's input. The server 104 does encrypted classification using logistic regression based on FHE and gives encrypted classification result to the client machine 102, who decrypts the result to see whether the URL is malicious or benign. Since feature extraction is done using n-grams based approach, higher n value will give more number of features. Considering computational limitations of FHE, it was found that tri-grams are more practical and efficient in FHE setting. Each element in the bag of tri-grams represents a feature vector. These feature vectors are given as input to the server 102 for classification. In an example, logistic regression uses sigmoid function to compute the gradient. Thus, in the n-grams technique, the URL string is split using special characters and then extract tri-grams from each resulting token. This feature set is referred as bag-of-ngrams (BoN). Again, distinction is made between n-grams appearing in the different parts of the URL. For instance, the BoN features of the URL paypalhelpservice.simdif.com are name={pay, ayp, ypa, pal, hel, elp, . . . , dif} and tld={com}.

According to yet another embodiment of the disclosure, the malicious URL detection can also be done utilizing a hybrid approach. The hybrid approach was done wherein the feature extraction is done using the embedding matrices and convolution layers from the URLNet architecture and these rich features are then used to train a logistic regression based classifier. This helps to mitigate the tradeoffs of both the techniques to provide an efficient privacy preserving malicious URL classifier. This hybrid model gives the performance of logistic regression model with the accuracy of a DNN. It should be appreciated that, the use of the bag of n-grams approach for the feature extraction and use of the DNN based approach classification is well within the scope of this disclosure.

According to an embodiment of the disclosure, the system 100 can also be explained with the help of following example. The experimentation results show that malicious URLs can be detected while protecting user privacy with a reasonable accuracy and efficiency and also highlight tradeoffs between computation requirement and accuracy.

Experiments were run using (i) Logistic Regression (ii) URLNet and (iii) Hybrid model, coupled with FHE implemented using HEAAN library. The experiments were run on a system that has Intel Xeon Gold CPU clocked at 2.4 Ghz, 64 GB RAM and run on 40 cores. Training was performed using PhishTank and valid URL dataset DMOZ. For this purpose the parameters were set to get at least 80 bits of security. For FHE operations HEAAN library was used which implements CKKS scheme. HEAAN library was chosen as it supports floating point numbers and negative numbers even while packing data which makes it suitable for machine learning applications.

Training: Model was trained on plaintext data using a dataset of 100,000 URLs divided into 80,000 URLs for training and 20,000 for testing. Training time for 80,000 URLs dataset for model based on (i) URLNet is 45 minutes (ii) logistic regression is 2 hours (iii) Hybrid is 3 hours.

DNN: Each feature vector is encrypted as a single ciphertext. Degree 5 and 4 approximation of ReLU function was used. It was observed that DNN implemented using degree 5 approximation outperforms DNN implemented using degree 4 approximation as shown in TABLE 4. Experiments in Table 4 uses embedded matrix and convolution layers for feature extraction and logistic regression for classification. While the DNN based classifier gives better accuracy, it is computationally expensive. Client side computation overhead is given in TABLE 1 and server side computation overhead is given in TABLE 3. It was observed that DNN based implementations have higher computational requirements.

Figure 8:
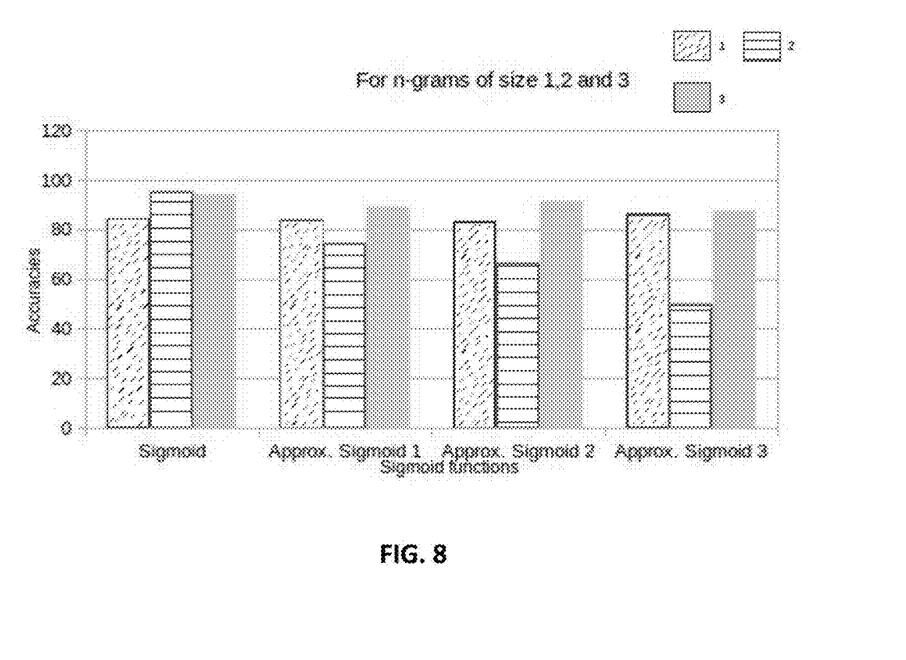
FIG. 8 shows graphical representation of logistic regression model accuracies with Sigmoid and its different approximations according to an embodiment of the disclosure.
Figure 9:
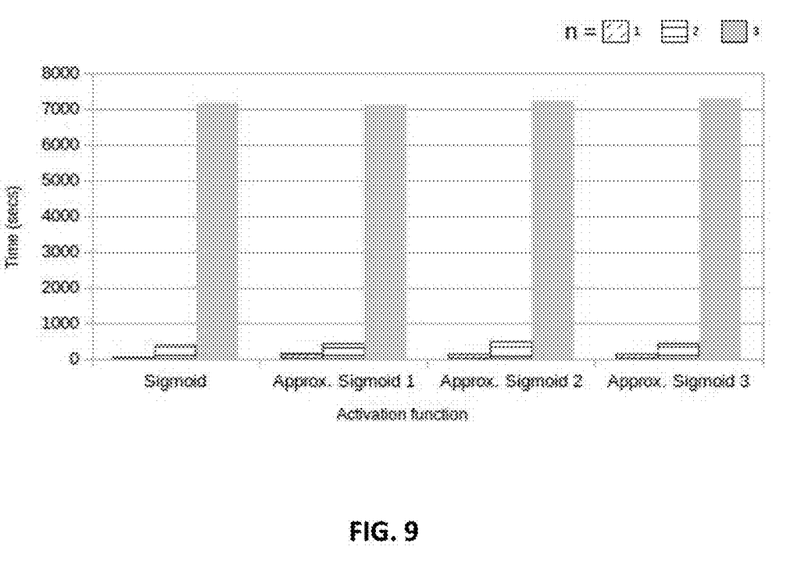
FIG. 9 shows graphical representation of Training times for n-grams of size 1, 2 and 3 performed on plaintext data according to an embodiment of the disclosure.

Logistic Regression: Experiments were run for logistic regression based on FHE on DMOZ dataset. It was observed that, accuracy of the prediction based on LR which uses built-in sigmoid function (python library) is high followed by that of approximated sigmoid function2 as shown in TABLE 4. FIG. 8 and FIG. 9 summarizes the results for different feature extraction using n-grams for n=1; 2; 3. Here it was observed that higher the n-grams, higher will be the accuracy of the prediction and also higher will be the computation time.

Hybrid: The accuracy of hybrid approach is given in TABLE 4. TABLES 1 and 3 show that hybrid approach gives less overhead both at client and server side without compromising the accuracy. The ciphertext size is less compared to DNN because DNN requires larger parameter set to accommodate more computations. It mitigates the tradeoffs of less accuracy of logistics regression based approach by taking features from URLnet and reduces computational requirements of DNN by relying on logistic regression model for classification. The server stores at least 512 ciphertexts, one each per neuron output as indicated by * in TABLE 1 for DNN.

TABLE 1

Client side computation overhead

| Method | # of features | Ciphertext size (KB) | Features encryption times (ms) | Decryption times (ms) |
| --- | --- | --- | --- | --- |
| DNN | 2k | 372.7* | 11.2 | 6.2 |
| LR | 5k | 458.7 | 18.4 | 8.9 |
| Hybrid | 2k | 229.4 | 8.94 | 3.74 |

TABLE 2

Approximation Polynomials for Sigmoid

| Approximation | Polynomial | Method |
| --- | --- | --- |
| 1 | $0.5 + 0..25x - 0.0208x^3 + 0.00208x^5$ | Taylor series in [−8, 8] |
| 2 | $0.5 + 0.15x - 0.0015x^3$ | Least square approximation |
| 3 | $0.5 + 0.253551x - 0.00148x^2 - 0.02587x^3 + 0.00158x^4 + 0.00371x^5$ | Lagranges interpolation in [−7, 7] |

TABLE 3

Server side computation overhead

| Method | Approximation | Accuracy (%) | Time (sec) | Memory Usage (Gb) |
|---|---|---|---|---|
| DNN | Approximation ReLU1 | 93.49 | 56 | 5.7 |
| LR | Approximation Sigmoid 2 | 91.43 | 1 | 0.13 |
| Hybrid | Approximation Sigmoid 3 | 93.03 | 0.8 | 0.03 |

TABLE 4

Results for three malicious URL detection classifiers

| DNN | | Logistic regression | | Hybrid | |
|---|---|---|---|---|---|
| Activation function | Accuracy (%) | Activation function | Accuracy (%) | Activation function | Accuracy (%) |
| ReIU | 96.5 | Sigmoid | 94.36 | Sigmoid | 95.6 |
| Approximation ReLU 1 | 93.49 | Approximation Sigmoid 1 | 89.26 | Approximation Sigmoid 1 | 92.8 |
| Approximation ReLU 2 | 52.87 | Approximation Sigmoid 2 | 91.43 | Approximation Sigmoid 2 | 92.6 |
| — | — | Approximation Sigmoid 3 | 87.57 | Approximation Sigmoid 3 | 93.03 |

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for classifying a website uniform resource locator (URL), comprising:
    providing the website URL as an input URL to a client machine, wherein the input URL is kept at a predefined character length, wherein a split architecture is implemented that includes the client machine and a server;
    extracting, by the client machine, a feature vector from the input URL;
    encrypting, by the client machine, the feature vector, wherein the encryption results in generation of a representative encrypted feature vector of the input URL, wherein the client machine shares a public key of the client machine to the server and retains a private key of the client machine as a secret key, wherein a plurality of encryptions is performed using the public key of the client machine;
    sending, by the client machine, the representative encrypted feature vector of the input URL to the server;
    computing, by the server, encrypted intermediate computation results by applying:
        at least one of a logistic regression (LR) based technique or a hybrid of a deep neural network (DNN) based technique and the LR based technique on the representative encrypted feature vector using polynomial approximation of an activation function, wherein the hybrid of the DNN based technique and the LR based techniques comprises:
            extracting, by the server, a plurality of features using an embedding matrix and a convolution layer from a URLNet; and
            training, by the server, an LR based classifier using the extracted plurality of features, wherein
            the DNN based technique further comprising computing encrypted intermediate computation result of a feed forward network of the deep neural network (DNN) on encrypted feature vectors of the input URL using polynomial approximation of an activation function, and
            the activation function includes at least one of a Hyperbolic Tangent Function (Tan h), a leaky Rectified Linear Unit (ReLU), and a Softmax function, wherein
            the logistic regression based technique is using a Sigmoid function,
            the sigmoid function is computed as $0.5 + 0.253551x - 0.00148x^2 - 0.02587x^3 + 0.00158x^4 + 0.00371x^5$
            'x' is an output of the DNN,
            the logistic regression based feature extraction method further comprising:
                identifying unique n-grams in the input URL out of the possible n-grams, wherein the unique n-grams are considered as a bag of n-grams with a predefined length; and
                dividing the input URL into n-grams, wherein each input URL is mapped to generate the feature vector of the predefined length, wherein the mapping is done by indicating presence or absence of the n-gram by using 1 or 0 respectively;
    sending, by the server, the encrypted intermediate computation results to the client machine;

decrypting, by the client machine, the encrypted intermediate computation results using a fully homomorphic encryption (FHE) method, wherein a plurality of decryptions is performed at the client machine using a private key of the client machine; and classifying, by the server and the client machine, the input URL as one of malicious or benign based on the mapping and the decrypted intermediate computation results.

2. The method of claim 1, wherein the DNN based technique further comprising:
dividing the input URL based on characters or based on words through tokenization, wherein the division results in the generation of a character level URL and a word level URL;
embedding the character level URL and the word level URL;
changing the character level URL and the word level URL into a matrix URL format using an embedding matrix, wherein the matrix URL comprising feature vectors representative of the input URL;
applying convolution layer and maxpooling to the matrix URL to detect semantic and sequential patterns on characters and words in the form of feature vectors, wherein max pooling is a sample-based discretization process;
concatenating the feature vectors detected from the words and characters to generate the feature vector.

3. The method of claim 1, wherein the logistic regression based feature extraction method further comprising
searching a URL dataset to find all possible n-grams, wherein a n-gram of the all possible n-grams is a string of n characters.

4. The method of claim 1, wherein the hybrid of DNN based technique and the LR based technique further comprising:
extracting feature either using embedded matrix and convolution layer from a URLNet or by a logistic regression;
training the logistic regression model using the extracted features; and
classifying the website URL using logistic regression based on the FHE or using DNN based on the FHE.

5. The method of claim 1, wherein the fully homomorphic encryption (FHE) is performed using at least one of an addition or a multiplication.

6. A system for classifying a website uniform resource locator URL, the system comprises:
a split architecture is implemented that includes a server and a client machine in communication with each other, wherein the server and the client machine further comprises:
an input module for providing the website URL as an input URL to the client machine, wherein the input URL is kept at a predefined character length;
one or more hardware processors; and
a memory in communication with the memory, wherein the memory configured to perform steps of:
extracting, by the client machine, a feature vector out of the input URL;
encrypting, by the client machine, the feature vector, wherein the encryption results in generation of a representative encrypted feature vector of the input URL, wherein the client machine shares a public key of the client machine to the server and retains a private key of the client machine as a secret key, wherein a plurality of encryptions is performed using the public key of the client machine;
sending, by the client machine, the representative encrypted feature vector of the input URL to the server;
computing, by the server, encrypted intermediate computation results by applying:
at least one of a deep neural network (DNN) based technique, a logistic regression (LR) based technique, or a hybrid of the DNN based technique, and
the LR based technique on the representative encrypted feature vector using polynomial approximation of an activation function, wherein the hybrid of the DNN based technique and the LR based techniques comprises:
extract, by the server, a plurality of features using an embedding matrix and a convolution layer from a URLNet; and
train, by the server, an LR based classifier using the extracted plurality of features;
sending, by the server, the encrypted intermediate computation results to the client machine, wherein the DNN based technique further comprising computing encrypted intermediate computation result of a feed forward network of the deep neural network (DNN) on encrypted feature vectors of the input URL using polynomial approximation of an activation function, and
the activation function includes at least one of a Hyperbolic Tangent Function (Tan h), a leaky Rectified Linear Unit (ReLU), and a Softmax function, wherein
the logistic regression based technique is using a Sigmoid function,
the sigmoid function is computed as $0.5+ 0.253551x-0.00148x^2-0.02587x^3+0.00158x^4+ 0.00371x,^5$
wherein 'x' is an output of the DNN,
the logistic regression based feature extraction method further comprising:
identify unique n-grams in the input URL out of the possible n-grams, wherein the unique n-grams are considered as a bag of n-grams with a predefined length; and
divide the input URL into n-grams, wherein each input URL is mapped to generate the feature vector of the predefined length, wherein the mapping is done by indicating presence or absence of the n-gram by using 1 or 0 respectively;
decrypting the encrypted intermediate computation results using the fully homomorphic encryption (FHE) method wherein a plurality of decryptions is performed at the client machine using a private key of the client machine; and
classifying, by the server and the client machine, the input URL as one of malicious or benign based on the mapping and the decrypted intermediate computation results.

7. One or more non-transitory machine readable information storage mediums comprising one or more instructions which when executed by one or more hardware processors cause managing a plurality of events, the instructions cause:
providing a website uniform resource locator (URL) as an input URL to a client machine, wherein the input URL is kept at a predefined character length, wherein a split architecture is implemented that includes the client machine and a server;

extracting, by the client machine, a feature vector from the input URL;

encrypting by the client machine the feature vector, wherein the encryption results in generation of a representative encrypted feature vector of the input URL, wherein the client machine shares a public key of the client machine to the server and retains a private key of the client machine as a secret key, wherein a plurality of encryptions is performed using the public key of the client machine;

sending, by the client machine, the representative encrypted feature vector of the input URL to the server;

computing, by the server, encrypted intermediate computation results by applying:

at least one of a deep neural network (DNN) based technique, a logistic regression (LR) based technique, or a hybrid of the DNN based technique, and the LR based technique on the representative encrypted feature vector, vector using polynomial approximation of an activation function, wherein the hybrid of the DNN based technique and the LR based techniques comprises:

extracting, by the server, a plurality of features using an embedding matrix and a convolution layer from a URLNet; and training, by the server, an LR based classifier using the extracted plurality of features, wherein the DNN based technique further comprising computing encrypted intermediate computation result of a feed forward network of the deep neural network (DNN) on encrypted feature vectors of the input URL using polynomial approximation of an activation function, and the activation function includes at least one of a Hyperbolic Tangent Function (Tan h), a leaky Rectified Linear Unit (ReLU), and a Softmax function, wherein the logistic regression based technique is using a Sigmoid function, the sigmoid function is computed as $0.5+0.253551x-0.00148x^2-0.02587x^3+0.00158x^4+0.00371x^5$ 'x' is an output of the DNN, the logistic regression based feature extraction method further comprising:

identifying unique n-grams in the input URL out of the possible n-grams, wherein the unique n-grams are considered as a bag of n-grams with a predefined length; and dividing the input URL into n-grams, wherein each input URL is mapped to generate the feature vector of the predefined length, wherein the mapping is done by indicating presence or absence of the n-gram by using 1 or 0 respectively;

sending, by the server, the encrypted intermediate computation results to the client machine;

decrypting, by the client machine, the encrypted intermediate computation results using a fully homomorphic encryption (FHE) method, wherein a plurality of decryptions is performed at the client machine using a private key of the client machine; and classifying, by the server and the client machine, the input URL as one of malicious or benign based on the mapping and the decrypted intermediate computation results.

* * * * *